United States Patent
Moore et al.

(10) Patent No.: US 9,313,854 B2
(45) Date of Patent: Apr. 12, 2016

(54) LED DRIVE CURRENT ADJUSTMENT FOR IRRADIANCE STEP RESPONSE OUTPUT

(71) Applicant: Phoseon Technology, Inc., Hillsboro, OR (US)

(72) Inventors: Ognyan Moore, Portland, OR (US); Paul Eddy, Portland, OR (US); Jeff Smith, Hillsboro, OR (US)

(73) Assignee: Phoseon Technology, Inc., Hillsboro, OR (US)

( * ) Notice: Subject to any disclaimer, the term of this patent is extended or adjusted under 35 U.S.C. 154(b) by 0 days.

(21) Appl. No.: 14/309,772

(22) Filed: Jun. 19, 2014

(65) Prior Publication Data

US 2015/0373804 A1  Dec. 24, 2015

(51) Int. Cl.
*H05B 33/08* (2006.01)

(52) U.S. Cl.
CPC .................................. *H05B 33/0851* (2013.01)

(58) Field of Classification Search
USPC ............. 315/185 R, 192, 224, 291, 297, 300, 315/299, 302, 307, 308, 311, 362
See application file for complete search history.

(56) References Cited

U.S. PATENT DOCUMENTS

| | | |
|---|---|---|
| 2010/0320908 A1 | 12/2010 | Hsu et al. |
| 2011/0156593 A1 | 6/2011 | De Greef et al. |
| 2013/0257313 A1* | 10/2013 | Battaglia ................ H05B 37/02 315/297 |
| 2014/0021884 A1 | 1/2014 | Fetterly et al. |

FOREIGN PATENT DOCUMENTS

| | | |
|---|---|---|
| EP | 1945998 B1 | 7/2014 |
| WO | 2011016853 A1 | 2/2011 |

OTHER PUBLICATIONS

ISA Korean Intellectual Property Office, International Search Report and Written Opinion Issued in Application No. PCT/US2015/035874, Sep. 1, 2015, WIPO, 16 pages.

* cited by examiner

*Primary Examiner* — Douglas W Owens
*Assistant Examiner* — Jianzi Chen
(74) *Attorney, Agent, or Firm* — Alleman Hall McCoy Russell & Tuttle LLP (57) ABSTRACT

A system and method for operating one or more light emitting devices is disclosed. In one example, the intensity of light provided by the one or more light emitting devices is adjusted responsive to a temperature of the one or more light emitting device. The light is adjusted via modifying a current supplied to the one or more light emitting devices.

18 Claims, 7 Drawing Sheets

LED DRIVE CURRENT ADJUSTMENT FOR IRRADIANCE STEP RESPONSE OUTPUT

FIELD

The present description relates to systems and methods for improving the irradiance and/or illuminance response of light-emitting diodes (LEDs). The methods and system may be particularly useful for lighting arrays that are commanded to output in a step-wise manner.

BACKGROUND/SUMMARY

Solid-state lighting devices may consume considerably less power as compared to incandescent lights. They may also be designed to output different wavelengths of light. Such attributes make solid-state lighting attractive for both residential and commercial applications. Some types of solid-state lighting devices may include laser diodes and light-emitting diodes (LEDs). Ultraviolet (UV) solid-state lighting devices may be used to curing photo sensitive media such as coatings, including inks, adhesives, preservatives, etc. In some applications, it may be desirable to provide different levels of irradiance from a single lighting array as part of a manufacturing process. For example, in one manufacturing process, it may be desirable for LEDs to output light at 100% capacity for a period of time and then reduce the LED output to 60% of capacity for a remainder of a curing period to finish a work piece. In another example, manufacturing flexibility may be increased by supplying two different work pieces having different light intensity curing needs to a single LED array. The two different work pieces may be individually cured by the LED array by adjusting LED array output in response to the type of work piece. However, LED array irradiance may not always be consistent when changing between different irradiance output levels. Therefore, it may be desirable to provide more consistent and uniform output from a LED array when switching between different irradiance output levels.

The inventors herein have recognized the challenge of providing a desired lighting output and have developed a method for operating one or more light emitting devices, comprising: selecting a current that corresponds to a desired irradiance output of the one or more light emitting devices in response to a change in the desired irradiance output of the one or more light emitting devices; and outputting the current modified via a linearized current adjustment to the one or more light emitting devices.

By modifying or adjusting a current supplied to one or more lighting devices via a linearized current adjustment, it may be possible to provide a substantially constant irradiance after adjusting lighting system irradiance in response to a change in desired irradiance. For example, an operator or controller may request a step increase or decrease in irradiance provided by a lighting array. A current supplied to the array may be adjusted via a linearized current adjustment to provide the new irradiance (e.g., the step increase in irradiance) level with little variation in the irradiance level. In this way, it may be possible to change from one irradiance level to a next irradiance level without a large variation in irradiance after the step increase is implemented.

The present description may provide several advantages. In particular, the approach may improve lighting system output consistency. Additionally, the approach may simplify lighting system computational processing. Further, the approach may provide for fast and accurate changes between different lighting output levels.

The above advantages and other advantages, and features of the present description will be readily apparent from the following detailed description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
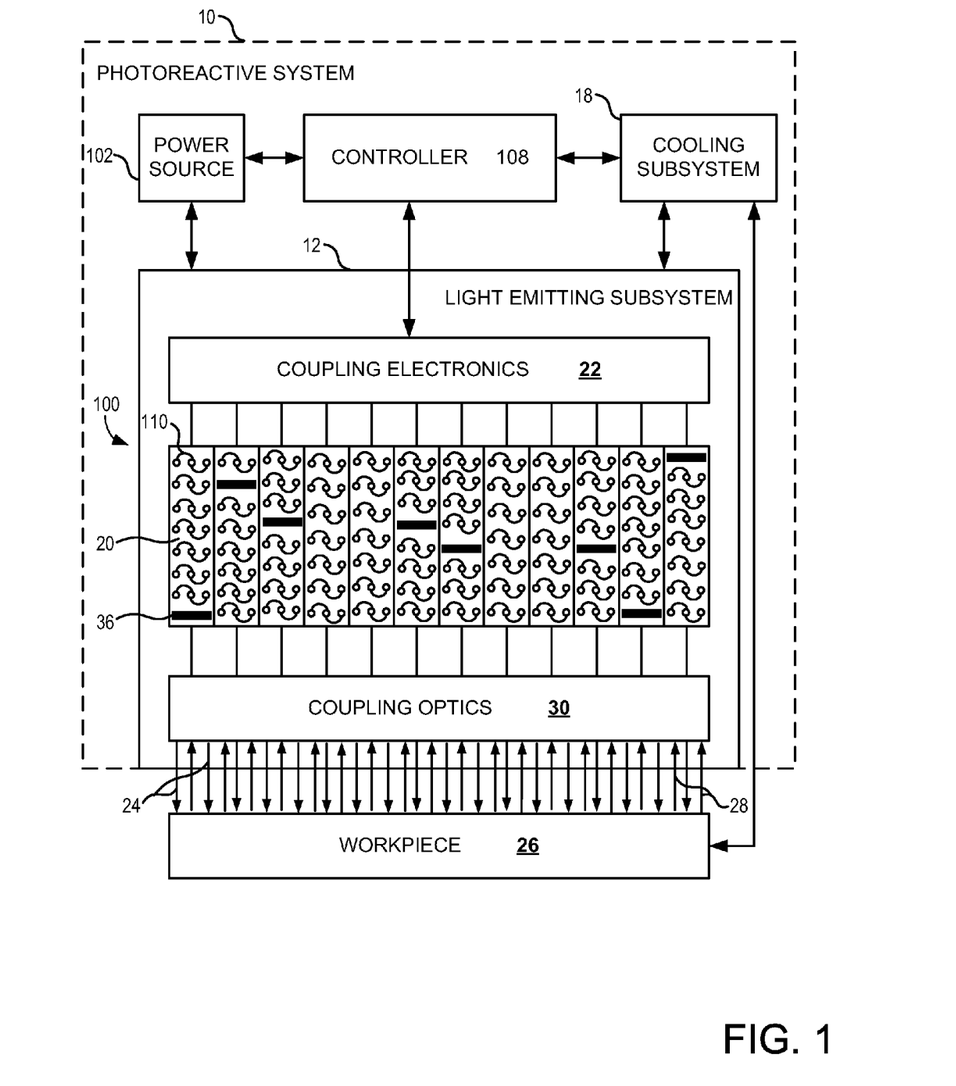
FIG. 1 shows a schematic depiction of a lighting system.
Figure 2:
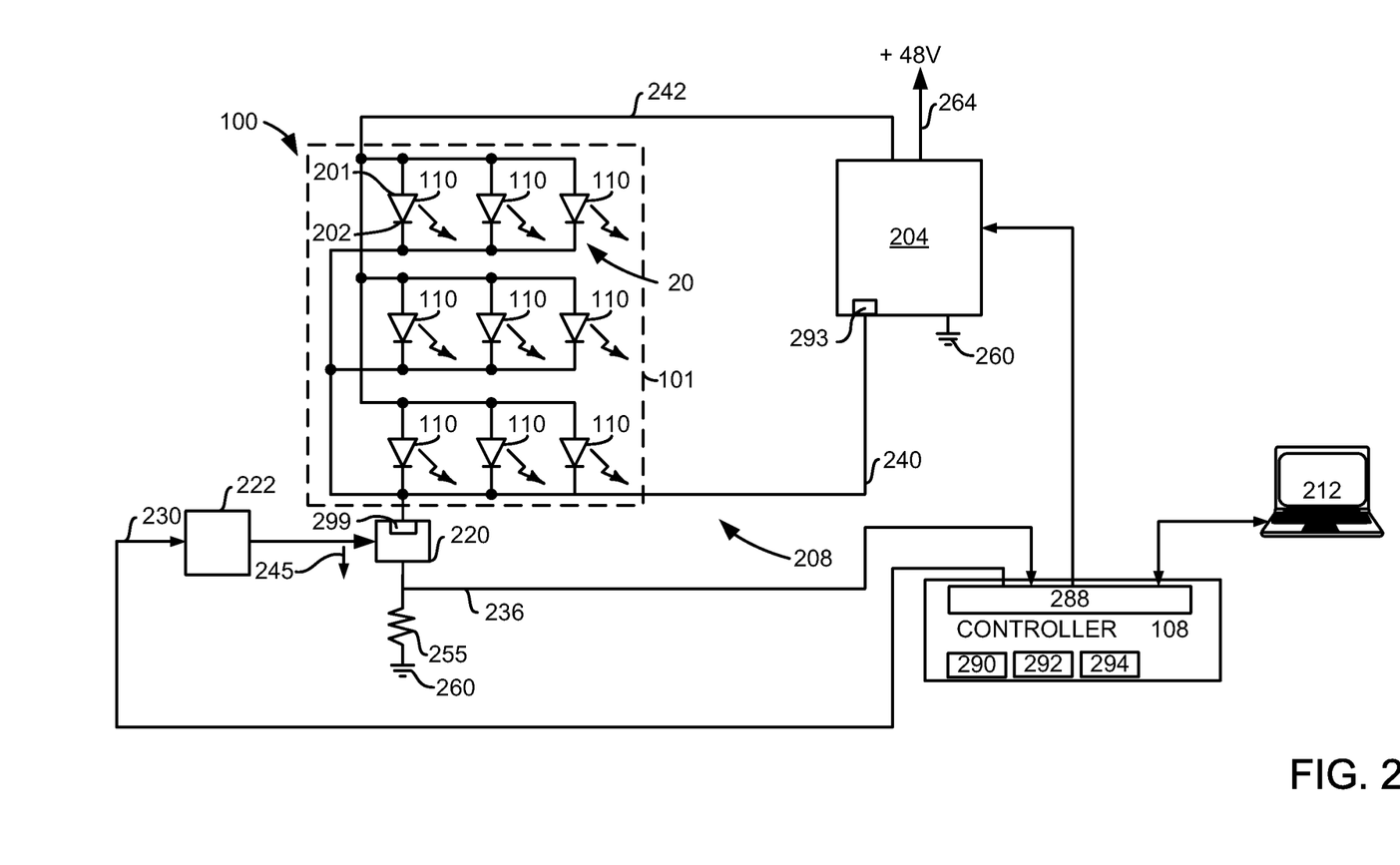
FIGS. 2-3 show schematics of example current regulating systems for the lighting system in FIG. 1.
Figure 3:
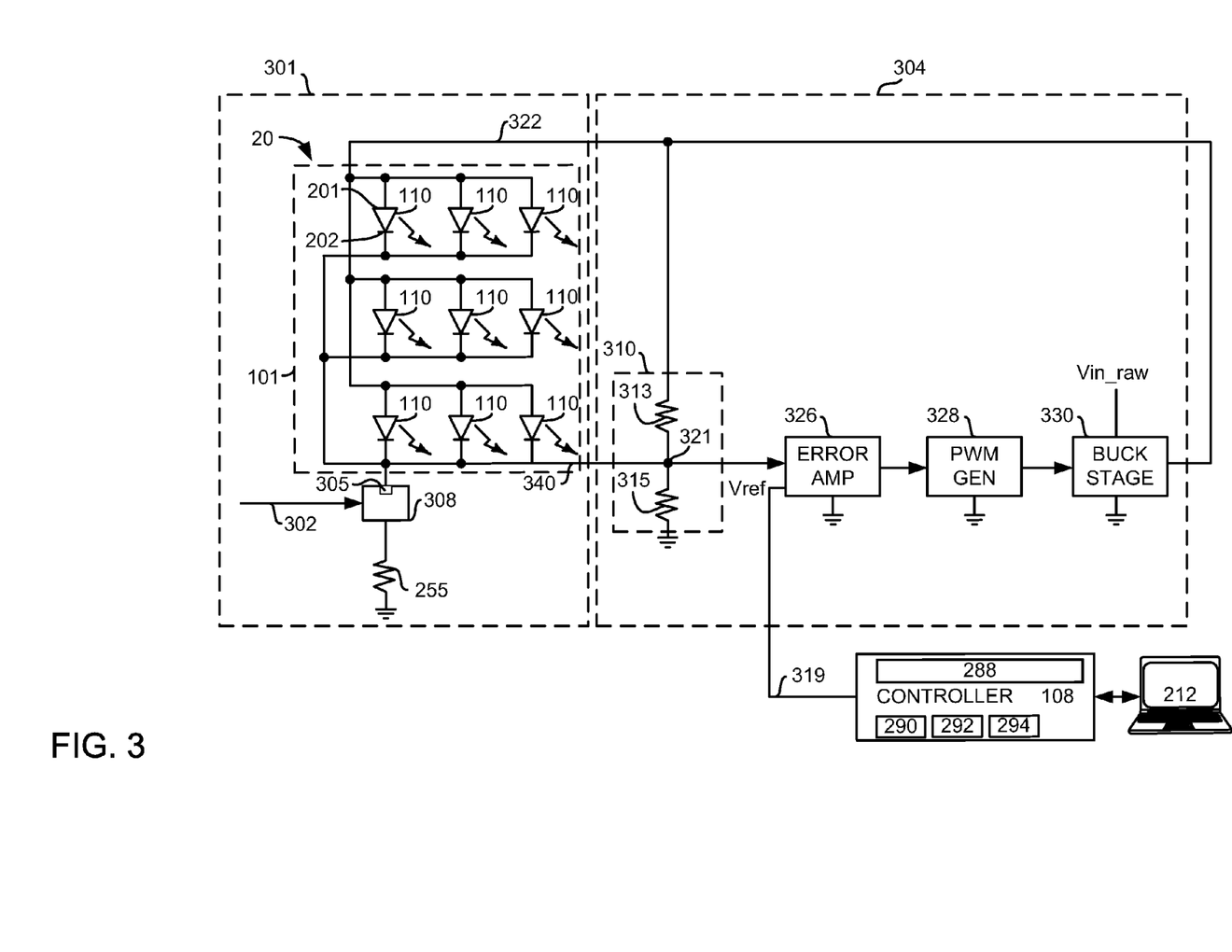

The present description is related to a lighting system having irradiance output at a plurality levels. FIG. 1 shows one example lighting system in which regulated variable current control is provided. The lighting current control may be provided according to example circuits as shown in FIGS. 2-3. Lighting system current adjustments may be provided according to the linear relationships shown in FIGS. 4 and 6. Lighting system current controlled as described herein may provide a lighting response as shown in FIG. 6. The lighting system may be operated according to the methods of FIGS. 7 and 8. Electrical interconnections shown between components in the various electrical diagrams represent current paths between the illustrated devices.

Referring now to FIG. 1, a block diagram of a photoreactive system 10 in accordance with the system and method described herein is shown. In this example, the photoreactive system 10 comprises a lighting subsystem 100, a controller 108, a power source 102 and a cooling subsystem 18.

The lighting subsystem 100 may comprise a plurality of light emitting devices 110. Light emitting devices 110 may be LED devices, for example. Selected of the plurality of light emitting devices 110 are implemented to provide radiant output 24. The radiant output 24 is directed to a work piece 26. Returned radiation 28 may be directed back to the lighting subsystem 100 from the work piece 26 (e.g., via reflection of the radiant output 24).

The radiant output 24 may be directed to the work piece 26 via coupling optics 30. The coupling optics 30, if used, may be variously implemented. As an example, the coupling optics may include one or more layers, materials or other structure interposed between the light emitting devices 110 providing radiant output 24 and the work piece 26. As an example, the coupling optics 30 may include a micro-lens array to enhance collection, condensing, collimation or otherwise the quality or effective quantity of the radiant output 24. As another example, the coupling optics 30 may include a micro-reflector array. In employing such micro-reflector array, each semiconductor device providing radiant output 24 may be disposed in a respective micro-reflector, on a one-to-one basis.

Each of the layers, materials or other structure may have a selected index of refraction. By properly selecting each index of refraction, reflection at interfaces between layers, materials and other structure in the path of the radiant output 24 (and/or returned radiation 28) may be selectively controlled. As an example, by controlling differences in such indexes of refraction at a selected interface disposed between the semiconductor devices to the work piece 26, reflection at that interface may be reduced, eliminated, or minimized, so as to enhance the transmission of radiant output at that interface for ultimate delivery to the work piece 26.

The coupling optics 30 may be employed for various purposes. Example purposes include, among others, to protect the light emitting devices 110, to retain cooling fluid associated with the cooling subsystem 18, to collect, condense and/or collimate the radiant output 24, to collect, direct or reject returned radiation 28, or for other purposes, alone or in combination. As a further example, the photoreactive system 10 may employ coupling optics 30 so as to enhance the effective quality or quantity of the radiant output 24, particularly as delivered to the work piece 26.

Selected of the plurality of light emitting devices 110 may be coupled to the controller 108 via coupling electronics 22, so as to provide data to the controller 108. As described further below, the controller 108 may also be implemented to control such data-providing semiconductor devices, e.g., via the coupling electronics 22.

The controller 108 preferably is also connected to, and is implemented to control, each of the power source 102 and the cooling subsystem 18. Moreover, the controller 108 may receive data from power source 102 and cooling subsystem 18.

The data received by the controller 108 from one or more of the power source 102, the cooling subsystem 18, the lighting subsystem 100 may be of various types. As an example, the data may be representative of one or more characteristics associated with coupled semiconductor devices 110, respectively. As another example, the data may be representative of one or more characteristics associated with the respective component 12, 102, 18 providing the data. As still another example, the data may be representative of one or more characteristics associated with the work piece 26 (e.g., representative of the radiant output energy or spectral component(s) directed to the work piece). Moreover, the data may be representative of some combination of these characteristics.

The controller 108, in receipt of any such data, may be implemented to respond to that data. For example, responsive to such data from any such component, the controller 108 may be implemented to control one or more of the power source 102, cooling subsystem 18, and lighting subsystem 100 (including one or more such coupled semiconductor devices). As an example, responsive to data from the lighting subsystem indicating that the light energy is insufficient at one or more points associated with the work piece, the controller 108 may be implemented to either (a) increase the power source's supply of current and/or voltage to one or more of the semiconductor devices 110, (b) increase cooling of the lighting subsystem via the cooling subsystem 18 (i.e., certain light emitting devices, if cooled, provide greater radiant output), (c) increase the time during which the power is supplied to such devices, or (d) a combination of the above.

Individual semiconductor devices 110 (e.g., LED devices) of the lighting subsystem 100 may be controlled independently by controller 108. For example, controller 108 may control a first group of one or more individual LED devices to emit light of a first intensity, wavelength, and the like, while controlling a second group of one or more individual LED devices to emit light of a different intensity, wavelength, and the like. The first group of one or more individual LED devices may be within the same array of semiconductor devices 110, or may be from more than one array of semiconductor devices 110. Arrays of semiconductor devices 110 may also be controlled independently by controller 108 from other arrays of semiconductor devices 110 in lighting subsystem 100 by controller 108. For example, the semiconductor devices of a first array may be controlled to emit light of a first intensity, wavelength, and the like, while those of a second array may be controlled to emit light of a second intensity, wavelength, and the like.

As a further example, under a first set of conditions (e.g. for a specific work piece, photoreaction, and/or set of operating conditions) controller 108 may operate photoreactive system 10 to implement a first control strategy, whereas under a second set of conditions (e.g. for a specific work piece, photoreaction, and/or set of operating conditions) controller 108 may operate photoreactive system 10 to implement a second control strategy. As described above, the first control strategy may include operating a first group of one or more individual semiconductor devices (e.g., LED devices) to emit light of a first intensity, wavelength, and the like, while the second control strategy may include operating a second group of one or more individual LED devices to emit light of a second intensity, wavelength, and the like. The first group of LED devices may be the same group of LED devices as the second group, and may span one or more arrays of LED devices, or may be a different group of LED devices from the second group, and the different group of LED devices may include a subset of one or more LED devices from the second group.

The cooling subsystem 18 is implemented to manage the thermal behavior of the lighting subsystem 100. For example, generally, the cooling subsystem 18 provides for cooling of such subsystem 12 and, more specifically, the semiconductor devices 110. The cooling subsystem 18 may also be implemented to cool the work piece 26 and/or the space between the piece 26 and the photoreactive system 10 (e.g., particularly, the lighting subsystem 100). For example, cooling subsystem 18 may be an air or other fluid (e.g., water) cooling system.

The photoreactive system 10 may be used for various applications. Examples include, without limitation, curing applications ranging from ink printing to the fabrication of DVDs and lithography. Generally, the applications in which the photoreactive system 10 is employed have associated parameters. That is, an application may include associated operating parameters as follows: provision of one or more levels of radiant power, at one or more wavelengths, applied over one or more periods of time. In order to properly accomplish the photoreaction associated with the application, optical power may need to be delivered at or near the work piece at or above a one or more predetermined levels of one or a plurality of these parameters (and/or for a certain time, times or range of times).

In order to follow an intended application's parameters, the semiconductor devices 110 providing radiant output 24 may be operated in accordance with various characteristics associated with the application's parameters, e.g., temperature, spectral distribution and radiant power. At the same time, the semiconductor devices 110 may have certain operating specifications, which may be are associated with the semiconductor devices' fabrication and, among other things, may be followed in order to preclude destruction and/or forestall degradation of the devices. Other components of the photoreactive system 10 may also have associated operating specifications. These specifications may include ranges (e.g., maximum and minimum) for operating temperatures and applied, electrical power, among other parameter specifications.

Accordingly, the photoreactive system 10 supports monitoring of the application's parameters. In addition, the photoreactive system 10 may provide for monitoring of semiconductor devices 110, including their respective characteristics and specifications. Moreover, the photoreactive system 10 may also provide for monitoring of selected other components of the photoreactive system 10, including their respective characteristics and specifications.

Providing such monitoring may enable verification of the system's proper operation so that operation of photoreactive system 10 may be reliably evaluated. For example, the system 10 may be operating in an undesirable way with respect to one or more of the application's parameters (e.g., temperature, radiant power, etc.), any components characteristics associated with such parameters and/or any component's respective operating specifications. The provision of monitoring may be responsive and carried out in accordance with the data received by controller 108 by one or more of the system's components.

Monitoring may also support control of the system's operation. For example, a control strategy may be implemented via the controller 108 receiving and being responsive to data from one or more system components. This control, as described above, may be implemented directly (e.g., by controlling a component through control signals directed to the component, based on data respecting that components operation) or indirectly (e.g., by controlling a component's operation through control signals directed to adjust operation of other components). As an example, a semiconductor device's radiant output may be adjusted indirectly through control signals directed to the power source 102 that adjust power applied to the lighting subsystem 100 and/or through control signals directed to the cooling subsystem 18 that adjust cooling applied to the lighting subsystem 100.

Control strategies may be employed to enable and/or enhance the system's proper operation and/or performance of the application. In a more specific example, control may also be employed to enable and/or enhance balance between the array's radiant output and its operating temperature, so as, e.g., to preclude heating the semiconductor devices 110 or array of semiconductor devices 110 beyond their specifications while also directing radiant energy to the work piece 26 sufficient to properly complete the photoreaction(s) of the application.

In some applications, high radiant power may be delivered to the work piece 26. Accordingly, the subsystem 12 may be implemented using an array of light emitting semiconductor devices 110. For example, the subsystem 12 may be implemented using a high-density, light emitting diode (LED) array. Although LED arrays may be used and are described in detail herein, it is understood that the semiconductor devices 110, and array(s) of same, may be implemented using other light emitting technologies without departing from the principles of the description, examples of other light emitting technologies include, without limitation, organic LEDs, laser diodes, other semiconductor lasers.

The plurality of semiconductor devices 110 may be provided in the form of an array 20, or an array of arrays. The array 20 may be implemented so that one or more, or most of the semiconductor devices 110 are configured to provide radiant output. At the same time, however, one or more of the array's semiconductor devices 110 are implemented so as to provide for monitoring selected of the array's characteristics. The monitoring devices 36 may be selected from among the devices in the array 20 and, for example, may have the same structure as the other, emitting devices. For example, the difference between emitting and monitoring may be determined by the coupling electronics 22 associated with the particular semiconductor device (e.g., in a basic form, an LED array may have monitoring LEDs where the coupling electronics provides a reverse current, and emitting LEDs where the coupling electronics provides a forward current).

Furthermore, based on coupling electronics, selected of the semiconductor devices in the array 20 may be either/both multifunction devices and/or multimode devices, where (a) multifunction devices are capable of detecting more than one characteristic (e.g., either radiant output, temperature, magnetic fields, vibration, pressure, acceleration, and other mechanical forces or deformations) and may be switched among these detection functions in accordance with the application parameters or other determinative factors and (b) multimode devices are capable of emission, detection and some other mode (e.g., off) and are switched among modes in accordance with the application parameters or other determinative factors.

Referring to FIG. 2, a schematic of a first lighting system circuit that may supply varying amounts of current is shown. Lighting system 100 includes one or more light emitting devices 110 in thermal communication with heat sink 101. In this example, light emitting devices 110 are light emitting diodes (LEDs). Each LED 110 includes an anode 201 and a cathode 202. Switching power source 102 shown in FIG. 1 supplies 48V DC power to voltage regulator 204 via path or conductor 264. Voltage regulator 204 supplies DC power to the anodes 201 of LEDs 110 via conductor or path 242. Voltage regulator 204 is also electrically coupled to cathodes 202 of LEDs 110 via conductor or path 240. Voltage regulator 204 is shown referenced to ground 260 and may be a buck regulator in one example. Voltage regulator 204 supplies an adjustable voltage to LEDs 110.

Controller 108 is shown in electrical communication with voltage regulator 204. In other examples, discrete input generating devices (e.g., switches) may replace controller 108, if desired. Controller 108 includes central processing unit 290 for executing instructions. Controller 108 also includes inputs and outputs (I/O) 288 for operating voltage regulator 204 and other devices. Non-transitory executable instructions may be stored in read only memory 292 (e.g., non-transitory memory) while variables may be stored in random access memory 294. Controller 108 may be in electrical communication with user interface 212 which allows a user to adjust irradiance output of lighting subsystem 100. In some examples, user interface 212 may include instructions stored in non-transitory memory for providing a digital potentiometer that allows current flowing through semiconductor devices 110 to be adjusted between 0-255 or more discrete current levels. Thus, irradiance output of lighting subsystem 100 may be adjusted to 256 levels.

Variable resistor 220 in the form of a field-effect transistor (FET) or other device receives an intensity signal voltage from controller 108 or via another input device. While the present example describes the variable resistor as an FET, one must note that the circuit may employ other forms of variable resistors.

In this example, at least one element of array 20 includes solid-state light-emitting elements such as light-emitting diodes (LEDs) or laser diodes produce light. The elements may be configured as a single array on a substrate, multiple arrays on a substrate, several arrays either single or multiple on several substrates connected together, etc. In one example, the array of light-emitting elements may consist of a Silicon Light Matrix™ (SLM) manufactured by Phoseon Technology, Inc.

The circuit shown in FIG. 2 is a closed loop current control circuit 208. In closed loop circuit 208, the variable resistor 220 receives an intensity voltage control signal via conductor or path 230 through the drive circuit 222. The variable resistor 220 receives its drive signal from the driver 222. Voltage between variable resistor 220 and array 20 is controlled to a desired voltage as determined by voltage regulator 204. The desired voltage value may be supplied by controller 108 or another device, and voltage regulator 204 controls voltage signal 242 to a level that provides the desired voltage in a current path between array 20 and variable resistor 220. Variable resistor 220 controls current flow from array 20 to current sense resistor 255 in the direction of arrow 245. The desired voltage may also be adjusted responsive to the type of lighting device, type of work piece, curing parameters, and various other operating conditions.

An electrical current signal may be fed back along conductor or path 236 to controller 108 or another device that adjusts the intensity voltage control signal provided to drive circuit 222 responsive to current feedback provided by path 236. In particular, if the electrical current signal is different from a desired electrical current, the intensity voltage control signal passed via conductor 230 is increased or decreased to adjust electrical current through array 20. A feedback current signal indicative of electrical current flow through array 20 is directed via conductor 236 as a voltage level that changes as electrical current flowing through current sense resistor 255 changes.

In one example where the voltage between variable resistor 220 and array 20 is adjusted to a constant voltage, current flow through array 20 and variable resistor 220 is adjusted via adjusting the resistance of variable resistor 220. Thus, a voltage signal carried along conductor 240 from the variable resistor 220 does not go to the array 20 in this example. Instead, the voltage feedback between array 20 and variable resistor 220 follows conductor 240 and goes to a voltage regulator 204. The voltage regulator 204 then outputs a voltage signal 242 to the array 20. Consequently, voltage regulator 204 adjusts its output voltage in response to a voltage downstream of array 20, and current flow through array 20 is adjusted via variable resistor 220. Controller 108 may include instructions to adjust a resistance value of variable resistor 220 in response to array current fed back as a voltage via conductor 236. Conductor 240 allows electrical communication between the cathodes 202 of LEDs 110, input 299 (e.g., a drain of an N-channel MOSFET) of variable resistor 220, and voltage feedback input 293 of voltage regulator 204. Thus, the cathodes 202 of LEDs 110, an input side 299 of variable resistor 220, and voltage feedback input 293 are at the same voltage potential.

The variable resistor may take the form of an FET, a bipolar transistor, a digital potentiometer or any electrically controllable, current limiting device. The drive circuit may take different forms depending upon the variable resistor used. The closed loop system operates such that an output voltage regulator 204 remains about 0.5 V above a voltage to operate array 20. The regulator output voltage adjusts voltage applied to array 20 and the variable resistor controls current flow through array 20 to a desired level. The present circuit may increase lighting system efficiency and reduce heat generated by the lighting system as compared to other approaches. In the example of FIG. 2, the variable resistor 220 typically produces a voltage drop in the range of 0.6V. However, the voltage drop at variable resistor 220 may be less or greater than 0.6V depending on the variable resistor's design.

Thus, the circuit shown in FIG. 2 provides voltage feedback to a voltage regulator to control the voltage drop across array 20. For example, since operation of array 20 results in a voltage drop across array 20, voltage output by voltage regulator 204 is the desired voltage between array 20 and variable resistor 220 plus the voltage drop across array 220. If the resistance of variable resistor 220 is increased to decrease current flow through array 20, the voltage regulator output is adjusted (e.g., decreased) to maintain the desired voltage between array 20 and variable resistor 20. On the other hand, if the resistance of variable resistor 220 is decreased to increase current flow through array 20, the voltage regulator output is adjusted (e.g., increased) to maintain the desired voltage between array 20 and variable resistor 20. In this way, the voltage across array 20 and current through array 20 may be simultaneously adjusted to provide a desired light intensity output from array 20. In this example, current flow through array 20 is adjusted via a device (e.g., variable resistor 220) located or positioned downstream of array 20 (e.g., in the direction of current flow) and upstream of a ground reference 260.

In this example, array 20 is shown where all LEDs are supplied power together. However, current through different groups of LEDs may be controlled separately via adding additional variable resistors 220 (e.g., one for each array that is supplied controlled current). Controller 108 adjusts current through each variable resistor to control current through multiple arrays similar to array 20.

Referring now to FIG. 3, a schematic of a second lighting system circuit that may be supplied varying amounts of current is shown. FIG. 3 includes some of the same elements as the first lighting system circuit shown in FIG. 2. Elements in FIG. 3 that are the same as elements in FIG. 2 are labeled with the same numeric identifiers. For the sake of brevity, a description of same elements between FIG. 2 and FIG. 3 is omitted; however, the description of elements in FIG. 2 applies to the elements in FIG. 3 that have the same numerical identifiers.

The lighting system shown in FIG. 3 includes a SLM section 301 that includes array 20 which includes LEDs 110. The SLM also includes switch 308 and current sense resistor 255. However, switch 308 and current sense resistor may be included with voltage regulator 304 or as part of controller 108 if desired. Voltage regulator 304 includes voltage divider 310 which is comprised of resistor 313 and resistor 315. Conductor 340 puts voltage divider 310 into electrical communication with cathodes 202 of LEDs 110 and switch 308. Thus, the cathodes 202 of LEDs 110, an input side 305 (e.g., a drain of a N channel MOSFET) of switch 308, and node 321 between resistors 313 and 315 are at a same voltage potential. Switch 308 is operated in only open or closed states, and it does not operate as a variable resistor having a resistance that can be linearly or proportionately adjusted. Further, in one example, switch 308 has a Vds of 0 V as compared to 0.6V Vds for variable resistor 220 shown in FIG. 2.

The lighting system circuit of FIG. 3 also includes an error amplifier 326 receiving a voltage that is indicative of current passing through array 20 via conductor 340 as measured by current sense resistor 255. Error amplifier 326 also receives a reference voltage from controller 108 or another device via conductor 319. Output from error amplifier 326 is supplied to the input of pulse width modulator (PWM) 328. Output from PWM is supplied to buck stage regulator 330, and buck stage regulator 330 adjusts current supplied between a regulated DC power supply (e.g., 102 of FIG. 1) and array 20 from a position upstream of array 20.

In some examples, it may be desirable to adjust current to array via a device located or upstream (e.g., in the direction of current flow) of array 20 instead of a position that is downstream of array 20 as is shown in FIG. 2. In the example lighting system of FIG. 3, a voltage the feedback signal supplied via conductor 340 goes directly to voltage regulator 304. A current demand, which may be in the form of an intensity voltage control signal, is supplied via conductor 319 from controller 108. The signal becomes a reference signal Vref, and it is applied to error amplifier 326 rather than to the drive circuit for a variable resistor.

The voltage regulator 304 directly controls the SLM current from a position upstream of array 20. In particular, resistor divider network 310 causes the buck regulator stage 330 to operate as a traditional buck regulator that monitors the output voltage of buck regulator stage 330 when the SLM is disabled by opening switch 308. The SLM may selectively receive an enable signal from conductor 302 which closes switch 308 and activates the SLM to provide light. Buck regulator stage 330 operates differently when a SLM enable signal is applied to conductor 302. Specifically, unlike more typical buck regulators, the buck regulator controls the load current, the current to the SLM and how much current is pushed through the SLM. In particular, when switch 308 is closed, current through array 20 is determined based on voltage that develops at node 321.

The voltage at node 321 is based on the current flowing through current sense resistor 255 and current flow in voltage divider 310. Thus, the voltage at node 321 is representative of current flowing through array 20. A voltage representing SLM current is compared to a reference voltage provided by controller 108 via conductor 319 that represents a desired current flow through the SLM. If the SLM current is different from the desired SLM current, an error voltage develops at the output of error amplifier 326. The error voltage adjusts a duty cycle of PWM generator 328 and a pulse train from PWM generator 328 controls a charging time and a discharging time of a coil within buck stage 330. The coil charging and discharging timing adjusts an output voltage of voltage regulator 304. Current flow through array 20 may be adjusted via adjusting the voltage output from voltage regulator 304 and supplied to array 20. If additional array current is desired, voltage output from voltage regulator 304 is increased. If reduced array current is desired, voltage output from voltage regulator 304 is decreased.

Thus, the system of FIGS. 1-3 provides for a system for operating one or more light emitting devices, comprising: a voltage regulator including a feedback input, the voltage regulator in electrical communication with the one or more light emitting devices; and a controller including non-transitory instructions to provide a linearized correction to current supplied to the one or more light emitting devices. The system includes where the linearized correction is a correction based on normalized light output and lighting device temperature. The system includes where the linearized correction is based on a slope and offset.

In some examples, the system further comprises additional instructions to divide the current supplied to the one or more light emitting devices by the linearized correction. The system further comprises additional instructions to revise the linearized correction in response to a temperature change of the one or more light emitting devices. The system further comprises additional instructions to not revise the linearized correction in response to an absence of temperature change of the one or more light emitting devices. The system further comprises additional instructions to revise the linearized correction at a fixed time interval.

Figure 4:
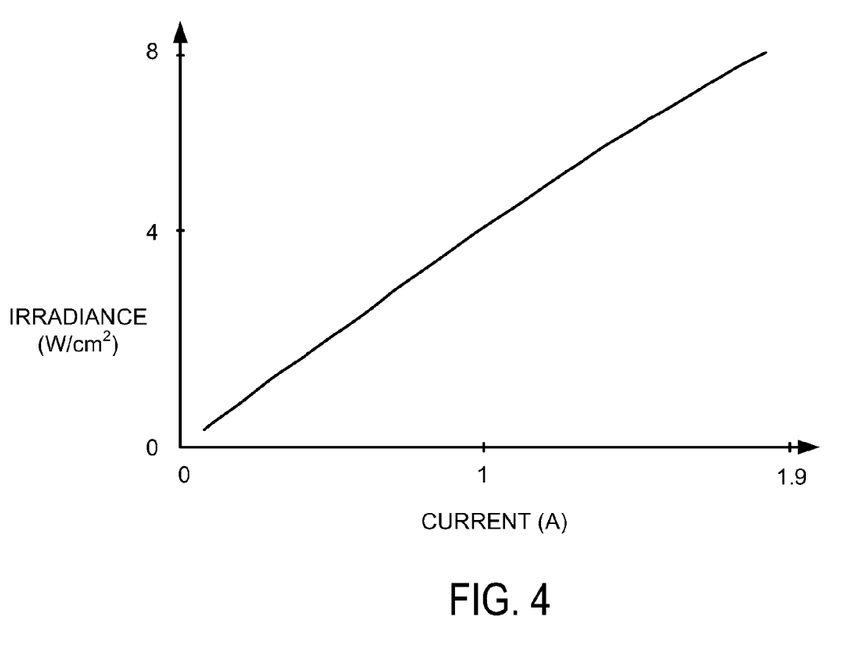
FIG. 4 shows a linear relationship between lighting device irradiance and current.

Referring now to FIG. 4, a plot showing a linear relationship between irradiance (e.g., lighting array output) and lighting array current is shown. The plot may be produced by adjusting current supplied to a lighting array as shown in FIGS. 1-3, recording irradiance produce by the lighting array, and plotting irradiance versus current. Thus, it may be observed that a linear relationship exists between lighting array current and irradiance (e.g., lighting array output). Specifically, irradiance increases linearly as current supplied to the lighting array increases.

Operation of one or more LEDs may be expressed from a simplified thermodynamic perspective as:

$$Power_{in} = Light_{out} + Heat$$

Where $Power_{in}$ is electrical power input to the lighting array, $Light_{out}$ is light energy output, and Heat is thermal energy output. Thus, if light output is to remain substantially constant as heat varies, the input power needs to vary. Notice that there is a directly proportional relationship between heat and electrical input power such that increased heat dissipation at the lighting array heat sink necessitates an increase in input power to the lighting array to provide a constant light output. The electrical input power to the lighting array is a product of current and voltage supplied to the lighting array. The lighting output follows a positive linear relationship with lighting array current in a region of the light output versus current curve where the lighting array is operated. Thus, the linear relationship between lighting output, heat, and input power is described by the power equation above and FIG. 4

Figure 5:
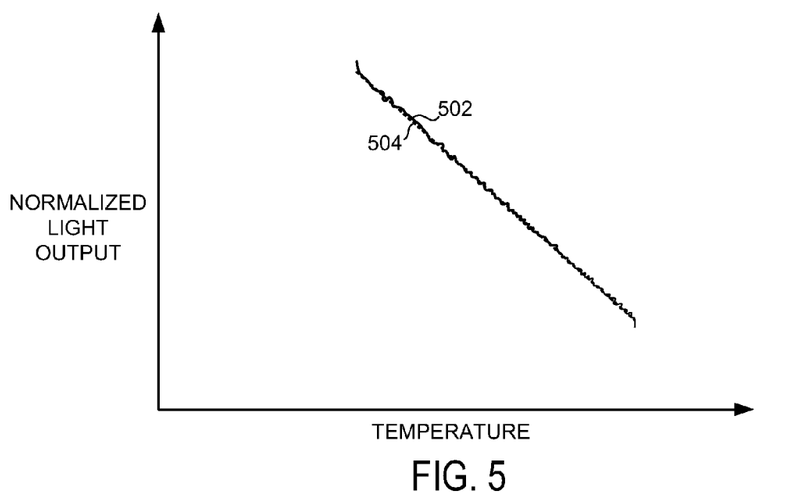
FIG. 5 shows a linear relationship between normalized lighting device output and lighting device temperature.
Figure 6:
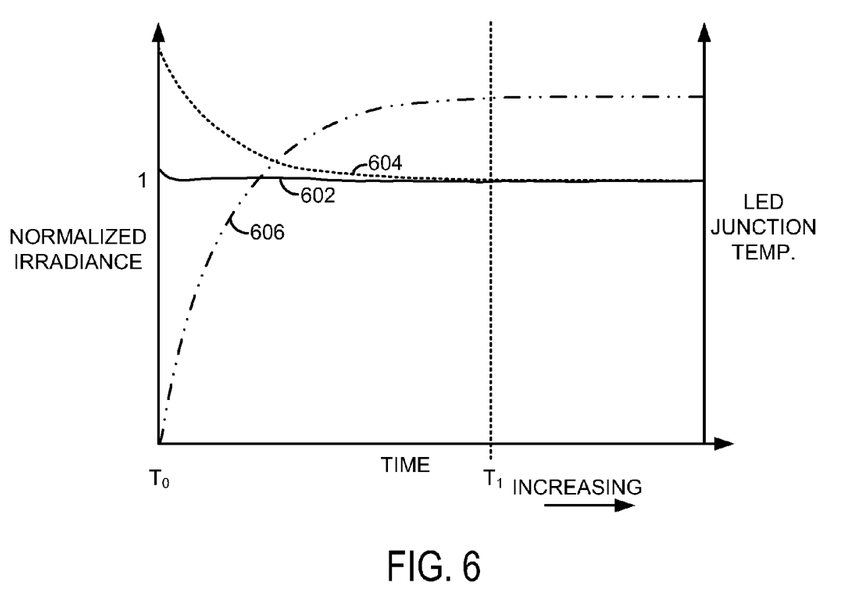
FIG. 6 shows a plot of an example simulated response of the lighting system shown in FIGS. 1-3.

Referring now to FIG. 5, a plot of normalized lighting array output (e.g., irradiance) versus lighting array temperature or lighting array heat sink temperature is shown. Solid line 502 represents a curve showing actual or simulated light output, and dashed line 504 represents a linear approximation of light output versus lighting array temperature or lighting array heat sink temperature. The values of light output and temperature may be determined via applying a current to the lighting array and recording lighting array temperature and irradiance. The equation of line 504 may be expressed as y=mx+b where y is irradiance, m is slope, x is lighting array temperature, and b is an offset. Since line 504 is linear, drive current supplied to the lighting array may be modified via the following equation:

$$I(T) = \frac{I_0}{Drive\_current\_adjustment}$$

Where I(T) is the commanded drive current; $I_0$ is the initial drive current, which may be an empirically determined value for a desired irradiance level at some predetermined temperature; and Drive_current_adjustment is the drive current adjustment determined from the equation y=mx+b or m·T(° C.)+b. The values of m and b are experimentally determined. By dividing the drive current that corresponds to the desired light output by the drive current adjustment, it is possible to slide up and down line 504 to adjust current supplied to the lighting array and achieve the desired level of light output.

Figure 7:
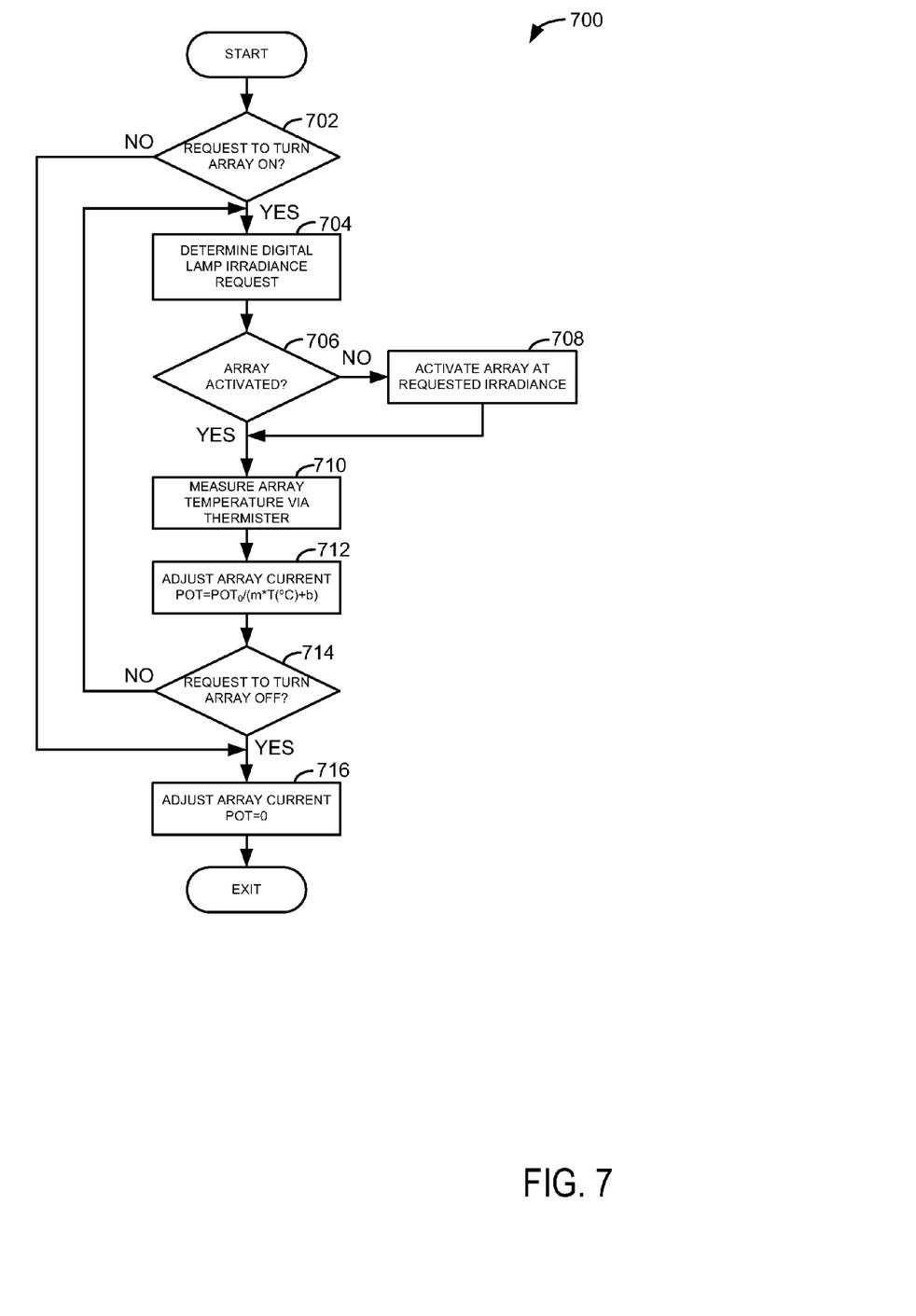
FIGS. 7 and 8 show example methods for controlling output of a lighting system.
Figure 8:
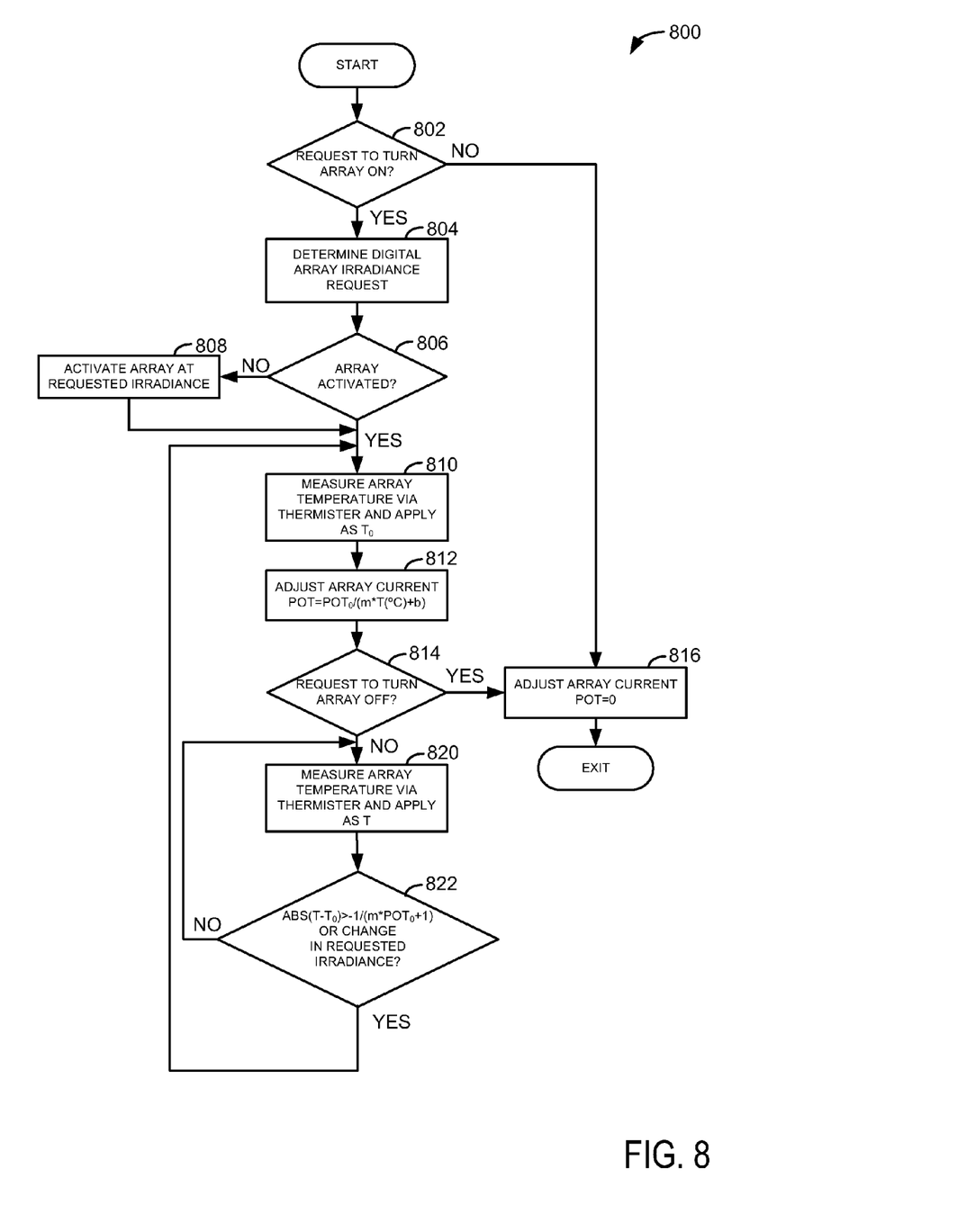

Referring now to FIG. 6, a plot of an example simulated response of a lighting system according to the methods of FIGS. 7 and 8 is shown. The plot of FIG. 6 includes a first Y axis on the left side of the plot and a second Y axis on the right side of the plot. The first Y axis represents normalized irradiance and the second Y axis represents LED junction temperature. The X axis represents time and time increases from the left side of the plot to the right side of the plot. Time begins at time $T_0$ and increases to the right side of the X axis. The lighting output of the array reaches a steady state value at time $T_1$ when the methods of FIGS. 7 and 8 is not used to control lighting array output.

The plot includes three curves 602-606. Curve 602 represents irradiance of array 20 responsive to a step change in requested lighting array output when lighting array current is controlled according to the method of FIGS. 7 and 8. Curve 604 represents irradiance of array 20 responsive to a step change in requested lighting array output, the same step change in requested lighting array output as for curve 602, when power is applied to array 20 without current control according to the method of FIGS. 7 and 8. Finally, curve 606 represents LED junction temperature for array 20 responsive to the same step change in requested lighting array output as for curve 602. The step change in requested lighting array output begins at time $T_0$.

It may be observed that curve 602 closely follows the step change in requested lighting array output. However, curve 604 shows that lighting array irradiance initially overshoots the desired output (e.g., the value of 1) and then decays to the desired output as the LED junction temperature increases. Consequently, the lighting array output may be greater than is desired in response to a request to increase lighting array output when lighting array current is not controlled according to the methods of FIGS. 7 and 8. Thus, if a voltage and/or current are simply increased in response to a request for additional lighting array output, lighting array output may exceed a desired level when the method of FIGS. 7 and 8 are not employed.

Thus, FIG. 6 shows that the methods of FIGS. 7 and 8 provide a more accurate light output that more closely follows a step change in desired light output. The methods of FIGS. 7 and 8 provides a near step in irradiance output in response to a step change in desired lighting array output.

Referring now to FIG. 7, a method for controlling irradiance output of a lighting system is shown. The method of FIG. 7 may be applied to a system as shown in FIGS. 1-3. The method may be stored as executable instructions in non-transitory memory of a controller. Further, the method of FIG. 7 may operate a lighting system as is shown in FIG. 6. Further still, the method of FIG. 7 may adjust lighting array current in response to step increases and decreases in requested irradiance.

At 702, method 700 judges if a LED array is presently being commanded on or if LEDs are already activated. In one example, method 700 may judge if LEDs are being commanded on or already active in response to a controller input. The controller input may interface with a pushbutton or operator control. The controller input may be at a value of one if the LEDs are being commanded on or if the LEDs are already activated. If method 700 judges that LEDs are being commanded on, or if the LEDs are already on, the answer is yes and method 700 proceeds to 704. Otherwise, the answer is no and method 700 proceeds to 716.

At 704, method 700 determines a digital value corresponding to a desired level of irradiance requested from the lighting array, and the desired level of irradiance is related to a desired lighting array current (I) as shown in FIG. 4. In one example, the digital value may vary between 0 and 255. However, in other examples, the digital value may vary between fewer or more values (e.g., 0 and 511). Method 700 may determine the desired level of irradiance requested from a variable in controller 108. The variable may be referred to as a digital potentiometer variable, and an operator may enter a value for the variable via a keyboard or other interface. In other examples, a physical potentiometer that outputs a digital value corresponding to a number between 0 and 255 may provide the digital value for the desired level of lighting array irradiance requested. The digital value may be referred to as $POT_0$ which is the digital potentiometer value associated with the desired irradiance level output from the lighting array. Method 700 proceeds to 706 after the desired irradiance level is determined.

At 706, method 700 judges whether or not the lighting array is activated. In one example, method 700 may judge that the lighting array is activated if a variable is a value greater than zero. In other examples, current flow through the lighting array may be sensed and the lighting array may be determined active if the current is greater than a threshold current. If method 700 judges that the lighting array is active, the answer is yes and method 700 proceeds to 710. Otherwise, the answer is no and method 700 proceeds to 708.

At 708, method 700 activates the lighting array at the desired irradiance requested at 704. In one example, the digital value is converted to an amount of current supplied to the lighting array. For example, if an operator requests a POT value of 200, which corresponds to three amperes, a current of three amperes is supplied to the lighting array. The current may be adjusted via a variable resistor as shown in FIG. 2. The variable resistor may be adjusted based on the POT value of 200, or the value 200 may be converted to an analog voltage that adjusts a resistance of the variable resistor to control lighting array current. Method 700 proceeds to 710 after the lighting array is activated at the desired irradiance level $POT_0$.

At 710, method 700 determines lighting array temperature. The lighting array temperature may be determined at a heat sink or at a junction of a LED in the lighting array. In one example, a thermistor or thermocouple may sense lighting array temperature and supply a voltage or current to a controller. The controller converts the voltage to a temperature via a transfer function. Method 700 proceeds to 712 after lighting array temperature is determined.

At 712, method 700 adjusts lighting array current by dividing the $POT_0$ value determined at 704 by the drive current adjustment described in FIG. 5. In particular, the value $POT_0$ is divided by the slope multiplied by the temperature determined at 710 plus the offset as determined as described in FIG. 5. The resulting current POT is commanded output to the lighting array. In this way, the initial $POT_0$ value of lighting array current is adjusted in response to lighting array temperature or lighting array heat sink temperature to provide the requested irradiance level. Method 700 proceeds to 714 after the lighting array current is adjusted and commanded output to the lighting array.

At 714, method 700 judges whether or not there is a request to turn the lighting array off. The lighting array may be turned off in response to a manual or automated lighting array off request. If method 700 judges that the lighting array is being requested to an off state, the answer is yes and method 700 proceeds to 716. Otherwise, the answer is no and method 700 returns to 704.

At 716, method 700 commands the POT value to zero, thereby commanding zero current be delivered to the lighting array. Method 700 proceeds to exit after ceasing current flow to the lighting array.

Thus, method 700 continuously determines lighting array temperature and adjusts current supplied to the lighting array in response to a linear relationship between lighting array irradiance and lighting array temperature as shown in FIG. 5. Consequently, the method of FIG. 7 may more accurately follow a desired irradiance. Further, the method of FIG. 7 may be executed at fixed or varying time intervals.

Referring now to FIG. 8, an alternative method for controlling irradiance output of a lighting system is shown. The method of FIG. 8 may be included as executable instructions stored in non-transitory memory in the system shown in FIGS. 1-3. Additionally, the method of FIG. 8 may operate a lighting system as is shown in FIG. 6. Further, the method of FIG. 8 may adjust lighting array current in response to step increases and decreases in requested irradiance.

At 802, method 800 judges if a LED array is presently being commanded on or if LEDs are already activated. In one example, method 800 may judge if LEDs are being commanded on or already active in response to a controller input. The controller input may interface with a pushbutton or operator control. The controller input may be at a value of one if the LEDs are being commanded on or if the LEDs are already activated. If method 800 judges that LEDs are being commanded on, or if the LEDs are already on, the answer is yes and method 800 proceeds to 804. Otherwise, the answer is no and method 800 proceeds to 816.

At 804, method 800 determines a digital value corresponding to a desired level of irradiance requested from the lighting array, and the desired level of irradiance is related to a desired lighting array current (I) as shown in FIG. 4. Method 800 may determine the desired level of irradiance requested from a variable in controller 108. The variable may be referred to as a digital potentiometer, and an operator may enter a value for the variable via a keyboard or other interface. In other examples, an actual potentiometer that outputs a digital value corresponding to a number between 0 and 255 may provide the digital value for the desired level of lighting array irradiance requested. The digital value may be referred to as $POT_0$ which is the digital potentiometer value associated with the desired irradiance level output from the lighting array. Method 800 proceeds to 806 after the desired irradiance level is determined.

At 806, method 800 judges if the lighting array is activated. In one example, method 800 may judge that the lighting array is activated if a variable is a value greater than zero. In other examples, current flow through the lighting array may be sensed and the lighting array may be determined active if the current is greater than a threshold current. If method 800 judges that the lighting array is active, the answer is yes and method 800 proceeds to 810. Otherwise, the answer is no and method 800 proceeds to 808.

At 808, method 800 activates the lighting array at the desired irradiance requested at 804. In one example, the digital value is converted to an amount of current supplied to the lighting array. For example, if an operator requests a POT value of 200, which corresponds to three amperes, a current of three amperes is supplied to the lighting array. The current may be adjusted via a variable resistor as shown in FIG. 2. The variable resistor may be adjusted based on the POT value of 200, or the value 200 may be converted to an analog voltage that adjusts a resistance of the variable resistor to control lighting array current. Method 800 proceeds to 810 after the lighting array is activated at the desired irradiance level $POT_0$.

At 810, method 800 determines lighting array temperature. The lighting array temperature may be determined at a heat sink or at a junction of a LED in the lighting array. In one example, a thermistor or thermocouple may sense lighting array temperature and supply a voltage or current to a controller. The controller converts the voltage to a temperature via a transfer function. Method 800 proceeds to 812 after lighting array temperature is determined.

At 812, method 800 adjusts lighting array current by dividing the $POT_0$ value determined at 804 by the drive current adjustment described in FIG. 5. In particular, the value $POT_0$ is divided by the slope multiplied by the temperature determined at 810 plus the offset as determined as described in FIG. 5. The resulting current POT is commanded output to the lighting array. In this way, the initial $POT_0$ value of lighting array current is adjusted in response to lighting array temperature or lighting array heat sink temperature to provide the requested irradiance level. Method 800 proceeds to 814 after the lighting array current is adjusted and commanded output to the lighting array.

At 814, method 800 judges if there is a request to turn the lighting array off. The lighting array may be turned off in response to a manual or automated lighting array off request. If method 800 judges that the lighting array is being requested to an off state, the answer is yes and method 800 proceeds to 816. Otherwise, the answer is no and method 800 proceeds to 820.

At 816, method 800 commands the POT value to zero, thereby commanding zero current be delivered to the lighting array. Method 800 proceeds to exit after ceasing current flow to the lighting array. The method of FIG. 8 may be executed at fixed or varying time intervals.

At 820, method 800 determines lighting array temperature and adjusts the temperature variable T to the presently determined lighting array temperature. In other words, the lighting array temperature stored in memory is adjusted to a present value of the lighting array temperature. Method 800 proceeds to 822 after the lighting array temperature is updated to a present temperature of the lighting array or of the lighting array heat sink.

At 822, method 800 judges if the absolute value of a change in lighting array temperature or lighting array heat sink temperature (e.g., $T-T_0$) is greater than $-1/(m \cdot POT_0+1)$ or if there is a change in the requested irradiance request (e.g., a change to the value of $POT_0$ determined at 804). If so, the answer is yes and method 800 returns to 810. Otherwise, the answer is no and method 800 returns to 820. If a change in irradiance is requested, a new value of $POT_0$ is output based on the requested level of irradiance. In this way, the lighting array current is not adjusted until a change in lighting array temperature is significant enough to result in incrementing or decrementing the POT value.

The basis for determining the change in lighting array temperature to adjust lighting array current may be determined as follows:

$$POT_1 = POT_0 + 1$$

$$POT_1 = \frac{POT_0}{m \times T_1 + b} \text{ and } POT_0 = \frac{POT_0}{m \times T_0 + b}$$

$$\Delta T = T_1 - T_0 = \frac{\left(\frac{POT_0}{POT_1}\right) - b}{m} - \left(\frac{1-b}{m}\right)$$

$$\Delta T \times m = \left(\frac{POT_0}{POT_1}\right) - 1$$

$$\Delta T \times m = \frac{POT_0}{POT_0 + 1} - 1$$

$$\Delta T \times m \times (POT_0 + 1) = POT_0 - POT_0 - 1$$

$$\Delta T = \frac{-1}{m \times (POT_0 + 1)}$$

Where $POT_1$ is $POT_0$ plus an increment of 1 (e.g., if $POT_0$ is 200, $POT_1$ is 201), m is the slope as previously described, $T_0$ is the temperature associated with $POT_0$, $T_1$ is the temperature associated with $POT_1$, b is the offset as previously described, and $\Delta T$ is a change in lighting array temperature that will result in incrementing the value of $POT_0$ by one in order to maintain a constant light output. It may be assumed that the lighting array outputs a same irradiance level for both cases. The drive current produced by the $POT_1$ value, while being greater than that of $POT_0$, is offset by $T_1$ being greater than $T_0$.

Thus, the methods of FIGS. 7 and 8 provide for operating one or more light emitting devices, comprising: selecting a current that corresponds to a desired irradiance output of the one or more light emitting devices in response to a change in the desired irradiance output of the one or more light emitting devices; and outputting the current modified via a linearized current adjustment to the one or more light emitting devices. The method includes where the linearized current adjustment is based on a temperature of the one or more light emitting devices.

In some examples, the method includes where the current is divided by the linearized current adjustment. The method includes where the linearized current adjustment is based on a slope and offset. The method includes where the slope and offset are based on normalized irradiance and a temperature of the one or more light emitting devices. The method includes where a variable resistor is adjusted to provide the current modified via a linearized current adjustment to the one or more light emitting devices. The method also includes where the change is a step increase change. The method includes where the change is a step decrease change.

In another example, the methods of FIGS. 7 and 8 provide for operating one or more light emitting devices, comprising: in response to a change is a temperature of the one or more light emitting devices being less than a threshold, continuing to monitor the temperature of the one or more light emitting devices and not revising a current supplied to the one or more light emitting devices; and in response to a change is a temperature of the one or more light emitting devices being greater than a threshold, revising a current supplied to the one or more light emitting devices in response to a temperature based linearized current adjustment. The method includes where the threshold is based on a slope. The method includes where the slope is based on a linear relationship between irradiation of the one or more light emitting devices and a temperature of the one or more light emitting devices. The method includes where the irradiation is normalized. The method includes where the current supplied to the one or more light emitting devices is divided by a current modifier.

This concludes the description. The reading of it by those skilled in the art would bring to mind many alterations and modifications without departing from the spirit and the scope of the description. For example, lighting sources producing different wavelengths of light may take advantage of the present description.

The invention claimed is:

1. A system for operating one or more light emitting devices, comprising:
   a voltage regulator including a feedback input, the voltage regulator in electrical communication with the one or more light emitting devices; and
   a controller including non-transitory instructions to provide a linearized correction to current supplied to the one or more light emitting devices, where the linearized correction is a correction based on normalized light output and lighting device temperature.

2. The system of claim 1, where the linearized correction is based on a slope and offset.

3. The system of claim 2, further comprising additional instructions to divide the current supplied to the one or more light emitting devices by the linearized correction.

4. The system of claim 1, further comprising additional instructions to revise the linearized correction in response to a temperature change of the one or more light emitting devices.

5. The system of claim 1, further comprising additional instructions to not revise the linearized correction in response to an absence of temperature change of the one or more light emitting devices.

6. The system of claim 1, further comprising additional instructions to revise the linearized correction at a fixed time interval.

7. A method for operating one or more light emitting devices, comprising:
   selecting a current that corresponds to a desired irradiance output of the one or more light emitting devices in response to a change in the desired irradiance output of the one or more light emitting devices; and
   outputting the current modified via a linearized current adjustment to the one or more light emitting devices, where the linearized current adjustment is based on a slope and offset.

8. The method of claim 7, where the linearized current adjustment is based on a temperature of the one or more light emitting devices.

9. The method of claim 7, where the current is divided by the linearized current adjustment.

10. The method of claim 7, where the slope and offset are based on normalized irradiance and a temperature of the one or more light emitting devices.

11. The method of claim 7, where a variable resistor is adjusted to provide the current modified via the linearized current adjustment to the one or more light emitting devices.

12. The method of claim 7, where the change is a step increase change.

13. The method of claim 7, where the change is a step decrease change.

14. A method for operating one or more light emitting devices, comprising:
   in response to a change in a temperature of the one or more light emitting devices being less than a threshold, continuing to monitor the temperature of the one or more light emitting devices and not revising a current supplied to the one or more light emitting devices; and
   in response to a change in a temperature of the one or more light emitting devices being greater than the threshold, revising the current supplied to the one or more light emitting devices in response to a temperature based linearized current adjustment.

15. The method of claim 14, where the threshold is based on a slope.

16. The method of claim 15, where the slope is based on a linear relationship between irradiation of the one or more light emitting devices and a temperature of the one or more light emitting devices.

17. The method of claim 16, where the irradiation is normalized.

18. The method of claim 14, where the current supplied to the one or more light emitting devices is divided by a current modifier.

* * * * *